E. JONES.
CAKE PAN.
APPLICATION FILED DEC. 26, 1911.
1,032,680.
Patented July 16, 1912.
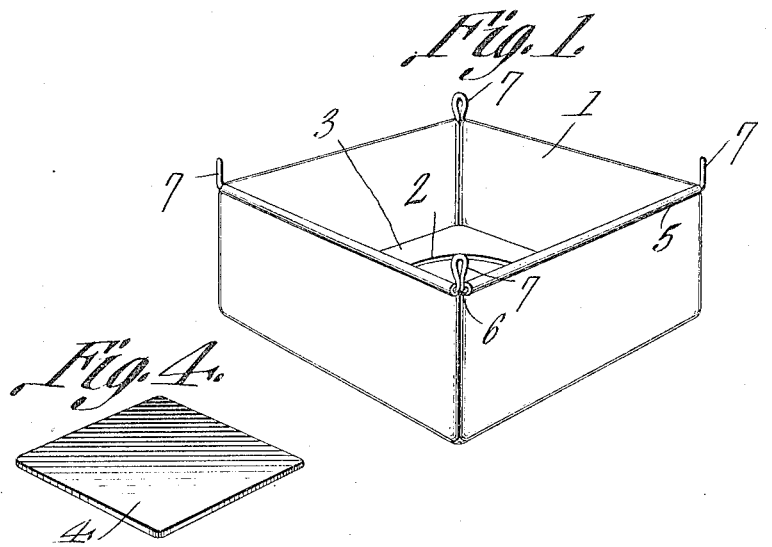
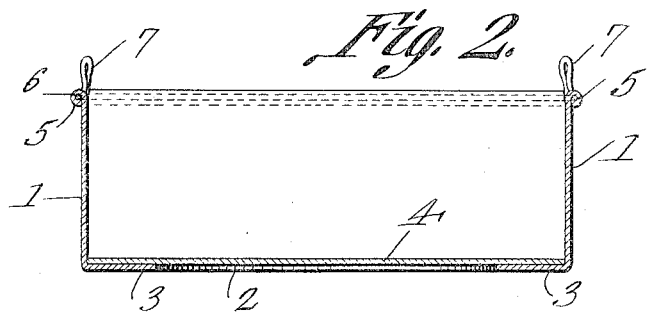
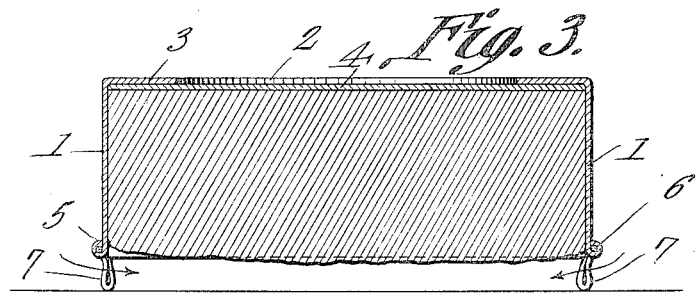
Effie Jones,
Inventor
Witnesses
by
Attorneys

UNITED STATES PATENT OFFICE.

EFFIE JONES, OF OTTAWA, KANSAS.

CAKE-PAN.

1,032,680.     Specification of Letters Patent.     Patented July 16, 1912.

Application filed December 26, 1911. Serial No. 667,699.

*To all whom it may concern:*

Be it known that I, EFFIE JONES, a citizen of the United States, residing at Ottawa, in the county of Franklin and State of Kansas, have invented a new and useful Cake-Pan, of which the following is a specification.

This invention relates to cake pans and its principal object is to provide a device of this character particularly designed for use in baking cakes such as are of a light spongy nature and among which may be mentioned those varieties known as angel food cake and sponge cake.

Heretofore it has been difficult to successfully bake cakes of this character because it has required considerable skill to remove them from the pans without breaking them. Furthermore it has been necessary, in order to prevent the cakes from "falling" to invert them and support them in such position as to permit air to circulate freely under the inverted cake. This has been difficult to accomplish.

One of the objects of the present invention is to provide a cake pan particularly designed for use in baking cakes of the character referred to, the pan not only being provided with means whereby the cake can be easily removed therefrom, but also having means for supporting it while inverted, with the cake out of contact with the surface on which the pan is mounted. While thus supported, the pan permits air to circulate freely across the lower face of the inverted cake.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of the pan. Fig. 2 is a central vertical section therethrough. Fig. 3 is a sectional view through the pan inverted and showing a cake supported therein for cooling purposes. Fig. 4 is a perspective view of the removable bottom of the pan.

Referring to the figures by characters of reference 1 designates a pan preferably rectangular although the same can be of any other desired contour. The bottom of the pan is provided with an opening 2 preferably circular and the wall of which is spaced from all of the walls of the pan 1 so as to form a bottom ledge 3 adapted to support the false bottom 4 of the pan. This false bottom is adapted to fit loosely within the pan. A bead 5 is preferably formed along the free or top edges of the walls of the pan and the wire 6 extended through the bead has loops 7 extending from the corners of the pan and adapted, when the pan is inverted to form legs for supporting the pan out of contact with the table or other structure on which it may be mounted.

As shown in the drawings the corners of the pan are preferably rounded so that the said pan can be easily cleaned.

In using the pan the false bottom 4 is placed on the ledge 3, as shown in Fig. 2 and the pan is then filled as ordinarily. After the cake has been baked the pan is inverted so that the legs 7 will support it with the cake out of contact with the surface on which the pan is mounted. This position of the parts has been illustrated in Fig. 3. With the pan and cake thus inverted, air is free to circulate between the cake and the supporting surface and after the cake has cooled sufficiently, it can be removed from the pan by cutting along the inner faces of the walls of the pan and then pushing the false bottom 4 out of the pan. Thus it will be seen that a cake of a light spongy nature can be successfully baked without danger of breaking it when removing it from the pan and without danger of the cake "falling" while cooling.

What is claimed is:—

An invertible pan including beads extending along the top edges of the walls thereof, and a wire extending through the beads and having an integral upstanding loop at each corner of the pan, all of said loops constituting legs when the pan is inverted for supporting all portions of the pan and its contents out of contact with the surface under the pan, said loops being located outside of the planes of the inner surfaces of the walls of the pan so as to constitute no obstructions in the path of the contents being removed from the pan.

In testimony that I claim the foregoing as my own, I have hereto affixed my signature in the presence of two witnesses.

EFFIE JONES.

Witnesses:
 MAY KEENE,
 LYDIA I. KENDALL.